(12) United States Patent
Cornell

(10) Patent No.: US 8,760,451 B2
(45) Date of Patent: Jun. 24, 2014

(54) RENDERING A TEXT IMAGE USING TEXTURE MAP CHARACTER CENTER ENCODING WITH CHARACTER REFERENCE ENCODING

(75) Inventor: Brian Cornell, Kenmore, WA (US)

(73) Assignee: Google Inc., Mountain View, CA (US)

( * ) Notice: Subject to any disclaimer, the term of this patent is extended or adjusted under 35 U.S.C. 154(b) by 362 days.

(21) Appl. No.: 13/174,403

(22) Filed: Jun. 30, 2011

(65) Prior Publication Data

US 2013/0002680 A1   Jan. 3, 2013

(51) Int. Cl.
*G06T 11/00* (2006.01)

(52) U.S. Cl.
USPC ............................................. 345/467

(58) Field of Classification Search
None
See application file for complete search history.

(56) References Cited

U.S. PATENT DOCUMENTS

| | | |
|---|---|---|
| 4,512,032 A | 4/1985 | Namba |
| 4,847,604 A | 7/1989 | Doyle |
| 4,864,628 A | 9/1989 | Scott |
| 5,134,663 A | 7/1992 | Kozlowski |
| 5,467,411 A | 11/1995 | Tanaka et al. |
| 5,724,072 A * | 3/1998 | Freeman et al. ............ 345/648 |
| 5,781,660 A | 7/1998 | Nitta et al. |
| 5,793,936 A | 8/1998 | Deffner et al. |
| 5,845,288 A | 12/1998 | Syeda-Mahmood |
| 6,052,480 A | 4/2000 | Yabuki et al. |
| 6,141,002 A | 10/2000 | Kanungo et al. |
| 6,441,826 B1 | 8/2002 | Miyata |
| 6,803,913 B1 * | 10/2004 | Fushiki et al. ............ 345/467 |
| 7,076,505 B2 | 7/2006 | Campbell |
| 7,123,277 B2 | 10/2006 | Brown Elliott et al. |
| 7,302,438 B1 | 11/2007 | Gauthier et al. |
| 7,305,617 B2 | 12/2007 | McCully |
| 7,358,975 B2 | 4/2008 | Wetzel |

(Continued)

OTHER PUBLICATIONS

International Search Report and Written Opinion for Application No. PCT/US2012/044602, dated Jan. 3, 2013.

(Continued)

*Primary Examiner* — Xiao Wu
*Assistant Examiner* — Yingchun He
(74) *Attorney, Agent, or Firm* — Marshall, Gerstein & Borun LLP

(57) ABSTRACT

A graphics or image rendering system, such as a map image rendering system, receives image data from an image database in the form of vector data that defines various image objects, such as roads, geographical boundaries, etc., and textures defining text strings to be displayed on the image to provide, for example, labels for the image objects. The imaging rendering system renders the images such that the individual characters of the text strings are placed on the image following a multi-segmented or curved line. In doing so, the image rendering system creates and reads a texture map that stores pixelated text characters of the text strings to be rendered in the image as a set of glyphs and that also stores first encoding data defining the center position of each text character as stored in a glyph and second encoding data referencing the location of the glyph to be used as the text character. This center position encoding enables the system to determine whether, in any particular instance, a text character of a text string should be rendered in the image at a particular position along the line or at a different position along the line while maximizing the storage efficiency of the texture map used to store the text string by allowing text characters repeated in a text string to be stored only once in the texture map.

42 Claims, 7 Drawing Sheets

(56) References Cited

U.S. PATENT DOCUMENTS

| | | |
|---|---|---|
| 7,362,898 B2 | 4/2008 | Fux et al. |
| 7,532,221 B2 | 5/2009 | Wetzel |
| 7,567,252 B2 | 7/2009 | Buck et al. |
| 7,729,538 B2 | 6/2010 | Shilman et al. |
| 7,787,708 B2 | 8/2010 | Scheidhauer et al. |
| 7,925,982 B2 | 4/2011 | Parker et al. |
| 7,969,456 B2 | 6/2011 | Brown Elliott et al. |
| 7,986,330 B2 | 7/2011 | Brokenshire et al. |
| 8,022,969 B2 | 9/2011 | Elliott |
| 8,400,453 B2 | 3/2013 | Cornell |
| 8,416,244 B2 | 4/2013 | Cornell |
| 2004/0125108 A1 | 7/2004 | McCully |
| 2007/0211062 A1* | 9/2007 | Engelman et al. ............ 345/467 |
| 2008/0104509 A1 | 5/2008 | Walker |
| 2008/0186325 A1 | 8/2008 | Higgins et al. |
| 2008/0253656 A1 | 10/2008 | Schwartzberg et al. |
| 2009/0158144 A1 | 6/2009 | Griffin |

OTHER PUBLICATIONS

Office Action for U.S. Appl. No. 13/847,376, dated Sep. 12, 2013.
Office Action for U.S. Appl. No. 13/847,376, dated Dec. 26, 2013.
Office Action for U.S. Appl. No. 13/244,771, dated Mar. 16, 2012.
Office Action for U.S. Appl. No. 13/174,283, dated Mar. 1, 2012.
Office Action for U.S. Appl. No. 13/174,283, dated Aug. 30, 2012.

* cited by examiner

RENDERING A TEXT IMAGE USING TEXTURE MAP CHARACTER CENTER ENCODING WITH CHARACTER REFERENCE ENCODING

FIELD OF TECHNOLOGY

The present disclosure relates to image rendering systems, such as electronic map display systems, and more specifically to an image rendering engine that renders a text image following a line such as multi-segmented line using texture map character center encoding with character reference encoding.

BACKGROUND

Digital maps are found in and may be displayed by a wide variety of devices, including mobile phones, car navigation systems, hand-held GPS units, computers, and many websites. Although digital maps are easy to view and to use from an end-user's perspective, creating a digital map is a difficult task and can be a time-consuming process. In particular, every digital map begins with storing, in a map database, a set of raw data corresponding to millions of streets and intersections and other features to be displayed as part of a map. The raw map data that is stored in the map database and that is used to generate digital map images is derived from a variety of sources, with each source typically providing different amounts and types of information. This map data must therefore be compiled and stored in the map database before being accessed by map display or map rendering applications and hardware.

There are, of course, different manners of digitally rendering map images (referred to as digital map images) based on map data stored in a map database. One method of rendering a map image is to store map images within the map database as sets of raster or pixelated images made up of numerous pixel data points, with each pixel data point including properties defining how a particular pixel in an image is to be displayed on an electronic display device. While this type of map data is relatively easy to create and store, the map rendering technique using this data typically requires a large amount of storage space for comprehensive digital map images, and it is difficult to manipulate the digital map images as displayed on a display device in very many useful manners.

Another, more flexible methodology of rendering images uses what is traditionally called vector image data. Vector image data is typically used in high-resolution and fast-moving imaging systems, such as those associated with gaming systems, and in particular three-dimensional gaming systems. Generally speaking, vector image data (or vector data) includes data that defines specific image objects or elements (also referred to as primitives) to be displayed as part of an image via an image display device. In the context of a map image, such image elements or primitives may be, for example, individual roads or road segments, text labels, areas, text boxes, buildings, points of interest markers, terrain features, bike paths, map or street labels, etc. Each image element is generally made up or drawn as a set of one or more triangles (of different sizes, shapes, colors, fill patterns, etc.), with each triangle including three vertices interconnected by lines. Thus, for any particular image element, the image database stores a set of vertex data points, with each vertex data point defining a particular vertex of one of the triangles making up the image element. Generally speaking, each vertex data point includes data pertaining to a two-dimensional or a three-dimensional position of the vertex (in an X, Y or an X, Y, Z coordinate system, for example) and various vertex attributes defining properties of the vertex, such as color properties, fill properties, line width properties for lines emanating from the vertex, etc.

During the image rendering process, the vertices defined for various image elements of an image to be rendered are provided to and are processed in one or more image shaders which operate in conjunction with a graphics processing unit (GPU), such as a graphics card or a rasterizer, to produce a two-dimensional image on a display screen. Generally speaking, an image shader is a set of software instructions used primarily to calculate rendering effects on graphics hardware with a high degree of flexibility. Image shaders are well known in the art and various types of image shaders are available in various application programming interfaces (APIs) provided by, for example, OpenGL and Direct3D, to define special shading functions. Basically, image shaders are simple programs in a high level programming language that describe or determine the traits of either a vertex or a pixel. Vertex shaders, for example, define the traits (e.g., position, texture coordinates, colors, etc.) of a vertex, while pixel or fragment shaders define the traits (color, z-depth and alpha value) of a pixel. A vertex shader is called for each vertex in an image element or primitive so that, for each vertex input into the vertex shader, the vertex shader produces one (updated) vertex output. Each vertex output by the vertex shader is then rendered as a series of pixels onto a block of memory that will eventually be sent to a display screen. As another example, fragment shaders use the vertices output by the vertex shaders to pixelate the image, i.e., to determine pixel color values of the image being created. Fragment shaders may fill in or render pixels based on the vertex attribute values of the vertices produced by the vertex shaders by interpolating between the vertex attribute values of different vertices of an image object. In other cases, fragments shaders may use predefined textures in the form of pixel color maps to fill in or to pixelate particular areas defined by the vertices of the image object. In this case, the textures define pixel values for various images to be rendered, and are generally used to render text or an image on a screen.

As a more particular example of image shader technology, Direct3D and OpenGL graphic libraries use three basic types of shaders including vertex shaders, geometry shaders, and pixel or fragment shaders. Vertex shaders are run once for each vertex given to the graphics processor. As noted above, the purpose of a vertex shader is to transform a position of a vertex in a virtual space to the two-dimensional coordinate at which it appears on the display screen (as well as a depth value for the z-buffer of the graphics processor). Vertex shaders can manipulate properties such as position, color, and texture coordinates by setting vertex attributes of the vertices, but cannot create new vertices. The output of the vertex shader is provided to the next stage in the processing pipeline, which is either a geometry shader if present or the rasterizer. Geometry shaders can add and remove vertices from a mesh of vertices and can be used to generate image geometry procedurally or to add volumetric detail to existing images that would be too costly to process on a central processing unit (CPU). If geometry shaders are being used, the output is then sent to the rasterizer. Pixel shaders, which are also known as fragment shaders, calculate the color and light properties of individual pixels in an image. The input to this stage comes from the rasterizer, and the fragment shaders operate to fill in the pixel values of the polygons being sent through the graphics pipeline and may use textures to define the pixel values within a particular image object. Fragment shaders are typically used for scene lighting and related effects such as color toning. There is not a one-to-one relationship between calls to the fragment shader and pixels on the screen as fragment shaders are often called many times per pixel because they are called for every image element or object that is in the corresponding space, even if that image object is occluded. However, if the occluding object is drawn first, the occluded pixels of other objects will generally not be processed in the fragment shader.

The use of vector graphics can be particularly advantageous in a mobile map system in which image data is sent from a centralized map database via a communications network (such as the Internet, a wireless communications network, etc.) to one or more mobile or remote devices for display. In particular, vector data, once sent to the receiving device, may be more easily scaled and manipulated (e.g., rotated, etc.) than pixelated raster image data. However, the processing of vector data is typically much more time consuming and processor intensive on the image rendering system that receives the data. Moreover, using vector image data that provides a higher level of detail or information to be displayed in a map leads to a higher amount of vector data or vertices that need to be sent to the map rendering system from the map database that stores this information, which can result in higher bandwidth requirements or downloading time in some cases.

Moreover, in the case of both rasterized map images and vector data generated images, text, such as that used to label streets, roads and other features of a map, is generally stored as a predetermined image. Such images are hard to manipulate so as to vary the placement of the text. In a pixelated map image, for example, the text is located in a fixed position with respect to other map features and it is thus difficult if not impossible to change the orientation or placement of the text with respect to other image objects. When using vector data, text is typically stored as a fixed image or string that is not tied to other map features and thus can be placed at different locations within a map. However, it is still difficult to manipulate the text image to vary placement of the individual characters within the text with respect to one another so as to make the characters of the text image to follow a line, such as a multi-segmented line, i.e., a line having multiple line segments that extend at angles from one another or a line that is curved.

SUMMARY

A computer-implemented method for rendering a text image on a display device, includes using a computer device to access an image lookup table having a set of encoded data for one or more text characters associated with a text string to be rendered in an image and reading the set of encoded data from the image lookup table to determine first and second encoding data for one of the text characters associated with the text string. More particularly, the first encoding data for the one of the text characters defines information about the position of the text character in the text string and the second encoding data for the one of the text characters defines a reference to a field of pixels in the image lookup table storing a set of pixel values defining the image to be rendered for the one of the text characters. Moreover, the method determines pixel values for the one of the text characters from the referenced field of pixels for the one of the text characters as stored within the image lookup table to analyze for rendering at a particular position within the image and determines a center position of the one of the text characters stored in the field of pixels defined by the second encoding data for the one of the text characters based on the first encoding data for the one of the text characters. The method then renders pixels of the one of the text characters at a particular position within the image based on the location of the center position of the one of the text characters.

In one embodiment, rendering the pixels of the one of the text characters at the particular position within the image based on the location of the center position of the one of the text characters includes determining if the center position of the one of the text characters, when rendered in a text box on the image, will be within a range of the text box and rendering the pixels of the one of the text characters at the particular position within the image when the center of the one of the text characters, when rendered in the text box on the image, will be within the range of the text box.

In one case, reading the set of encoding data includes reading the first encoding data specifying a width of the text character. Additionally, reading the first encoding data may include reading the first encoding data stored for a particular column of pixels of the one of the text characters, wherein the first encoding data specifies the distance from the particular column of pixels of the one of the text characters to a column of pixels at the center of the one of the text characters. If desired, reading the set of encoding data may include reading first encoding data stored in the image lookup table at a position adjacent to the second encoding data.

In one embodiment, reading the set of encoding data includes reading the first encoding data stored in a row of the image lookup table having first encoding data information defining, for each of a plurality of columns of the image lookup table, the distance from a column location to the column location of the center of the one of the text character. In this case, reading the set of encoding data may include reading the second encoding data from a row of the image lookup table associated with the row of the first encoding data, the second encoding data having a fixed location with respect to one of the columns of the first encoding data.

Moreover, if desired, the first encoding data for the one of the text characters is stored in a first row of encoding data spanning multiple columns of the image lookup table and the second encoding data for the one of the text characters is stored in a second row of encoding data spanning a plurality of columns of the text image lookup table defining a subset of the multiple columns of the image lookup table used by the first encoding data.

In another embodiment, an image rendering engine includes a processor, a memory coupled to the processor, a display device coupled to the processor and a text string lookup table stored in the memory. The text string lookup table includes a set of glyphs and one or more sections of encoding data, wherein each glyph is stored as a field of pixels defining a displayable image associated with a text character, and wherein each section of encoding data defines a text string to be rendered in an image. Here, each section of encoding data includes one or more sets of character encoding data with each set of character encoding data including first encoding data defining information about a position of a particular text character in the text string and second encoding data defining a reference to one of the glyphs to define the identity of the particular text character in the text string. Moreover, a routine executes to read the first and second encoding data of a particular set of character encoding data for a text character to determine a position of one or more pixels stored with a glyph associated with the text character within the text string to be rendered in an image.

In one case, the sets of character encoding data for one of sections of encoding data are stored as a single line of sets of character encoding data with the first encoding data for each text character within the one of the sections of encoding data sharing at least one common row in the text string lookup table but not having any overlapping columns in the text string lookup table. In another case, the sets of character encoding data for one of sections of encoding data are stored as a two or more lines of sets of character encoding data with the first encoding data for each text character in the same line of sets of character encoding data sharing at least one common row in the text string lookup table but not having any overlapping columns in the text string lookup table and with the first encoding data for each text character in different lines of sets of character encoding data not sharing any rows of the text string lookup table. Here, the first encoding data for at least one text character in a first one of the lines of sets of character encoding data includes a column that overlaps with a column of a first encoding data of a different text character in a second one of the lines of sets of character encoding data. In one embodiment, the at least one text character and the different text character are adjacent text characters in the text string defined by the section of encoding data.

In another embodiment, a method of creating a text string lookup table includes storing, in a computer memory at memory positions defining the text string lookup table, a set of glyphs, wherein each glyph is stored as a field of pixels defining a displayable image associated with a text character such that multiple pixels are stored in the memory for each glyph and storing in the computer memory at memory positions defining the text string lookup table, one or more sections of encoding data. In this case, each section of encoding data defines a text string to be rendered in an image and each section of encoding data includes one or more sets of character encoding data with each set of character encoding data defining a text character of the text string and including first encoding data defining information about a position of a text character in the text string and second encoding data defining a reference to one of the glyphs to define the identity of the text character in the text string.

If desired, the storing the first encoding data for each text character may include storing first encoding data defining the center position of a text character of the text string, the first encoding data for each of the sets of character encoding data being coordinated in location within the memory defining the text string lookup table with the second encoding data of the same set of character encoding data.

DETAILED DESCRIPTION

A graphics or image rendering system, such as a map image rendering system, receives image data from an image database or from an application generating the image data in the form of vector data that defines various image objects, such as roads, boundaries, etc., and textures defining text strings to be displayed on the image to provide, for example, labels for the image objects. The imaging rendering system renders the images such that the individual characters of the text strings are placed on the image following a multi-segmented line, e.g., a curved line. This rendering system enables, for example, text strings to be placed on a map image so that the text follows the center line of a curved or angled road or other image feature. In doing so, the image rendering system creates and reads a texture map that stores pixelated text characters of the text strings to be rendered in the image as a set of glyphs and that also stores first encoding data defining the center position of each text character as stored in a glyph and second encoding data referencing the location of the glyph to be used as the text character. This center position encoding enables the system to determine whether, in any particular instance, a text character of a text string should be rendered in the image at a particular position along the line or at a different position along the line while maximizing the storage efficiency of the texture map used to store the text string by allowing text characters repeated in a text string to be stored only once in the texture map. This encoding and rendering technique provides great flexibility in rendering text within an image because this technique allows text to be rendered so as to follow a line without knowing the specifics of the curvature of the line along which the text will be placed when creating the texture that stores the text string information. This feature provides enhanced visual properties within a map image as it allows, for example, road names to be placed anywhere inside a road following the curvature of the road, thus providing a pleasing visual effect within the map image being rendered.

Figure 1:
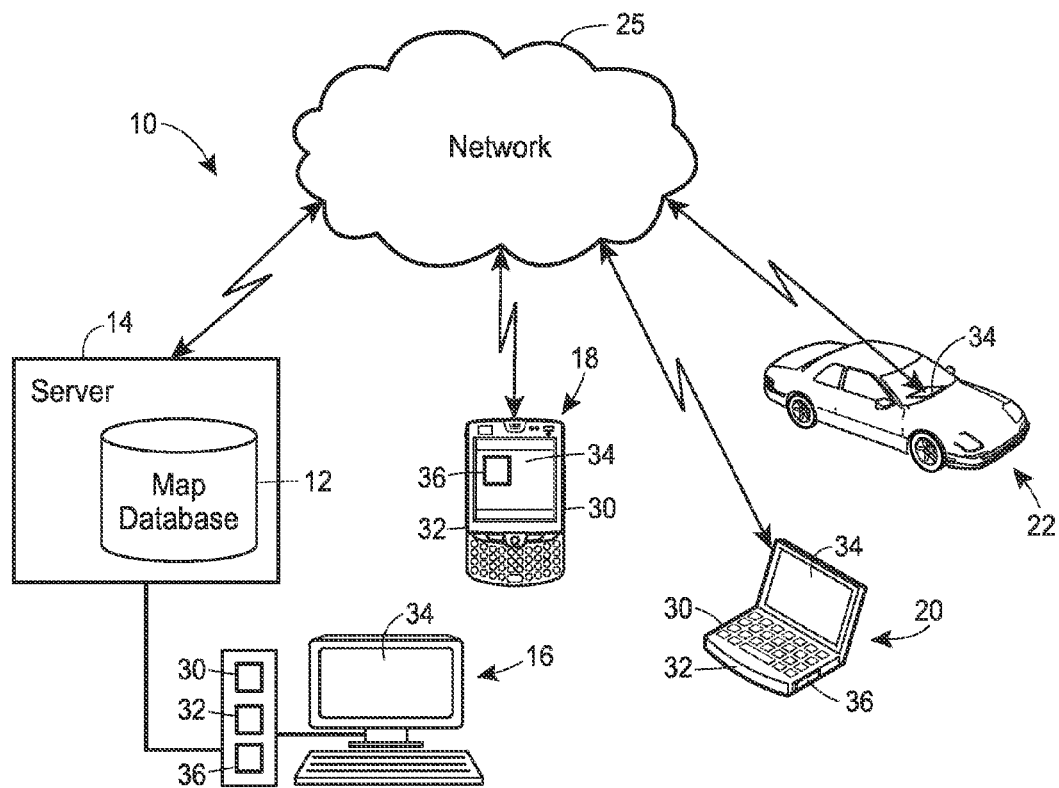
FIG. 1 is a high level block diagram of a map imaging system that implements communications between a map database stored in a server and one or more map image rendering devices.

Referring now to FIG. 1, a map-related imaging system 10 includes a map database 12 stored in a server 14 or in multiple servers located at, for example, a central site or at various different spaced apart sites, and also includes multiple map client devices 16, 18, 20, and 22, each of which stores and implements a map rendering device or a map rendering engine. The map client devices 16-22 may be connected to the server 14 via any hardwired or wireless communication network 25, including for example a hardwired or wireless LAN, MAN or WAN, the Internet, or any combination thereof. The map client devices 16-22 may be, for example, mobile phone devices (18), computers such a laptop, desktop or other types of computers (16, 20) or components of other imaging systems such as components of automobile navigation systems (22), etc. Moreover, the client devices 16-22 may be communicatively connected to the server 14 via any suitable communication system, such as any publicly available or privately owned communication network, including those that use hardwired based communication structure, such as telephone and cable hardware, and/or wireless communication structure, such as wireless communication networks, including for example, wireless LANs and WANs, satellite and cellular phone communications systems, etc.

The map database 12 may store any desired types or kinds of map data including raster image map data and vector image map data. However, the image rendering systems described herein are best suited for use with vector image data which defines or includes a series of vertices or vertex data points for each of numerous sets of image objects, elements or primitives within an image to be displayed and which uses textures to define text strings to be displayed on a map. Generally speaking, each of the image objects defined by the vector data will have a plurality of vertices associated therewith and these vertices will be used to display a map related image object to a user via one or more of the client devices 16-22. Moreover, various texture maps defining, for example, text images or text characters, may be stored in the map database 12 for use in rendering labels or other images on the map or these texture maps may be generated from text characters in one or more applications within the client devices 16-22.

As will also be understood, each of the client devices 16-22 includes an image rendering engine having one or more processors 30, one or more memories 32, a display device 34, and in many cases a rasterizer or graphics card 36 which are generally programmed and interconnected in known manners to implement or to render graphics (images) on the associated display device 34. The display device 34 for any particular client device 16-22 may be any type of electronic display device such as a liquid crystal display (LCD), a light emitting diode (LED) display, a plasma display, a cathode ray tube (CRT) display, or any other type of known or suitable electronic display.

Generally speaking, the map-related imaging system 10 of FIG. 1 operates such that a user, at one of the client devices 16-22, opens or executes a map application (not shown in FIG. 1) that operates to communicate with and to obtain map information or map related data from the map database 12 via the server 14, and that then displays or renders a map image based on the received map data. The map application may allow the user to view different geographical portions of the map data stored in the map database 12, to zoom in or zoom out on a particular geographical location, to rotate, spin or change the two-dimensional or three-dimensional viewing angle of the map being displayed, etc. More particularly, when rendering a map image on a display device or a display screen 34 using the system described below, each of the client devices 16-22 downloads map data in the form of vector data from the map database 12 and processes that vector data using one or more image shaders to render an image on the associated display device 34.

Figure 2:
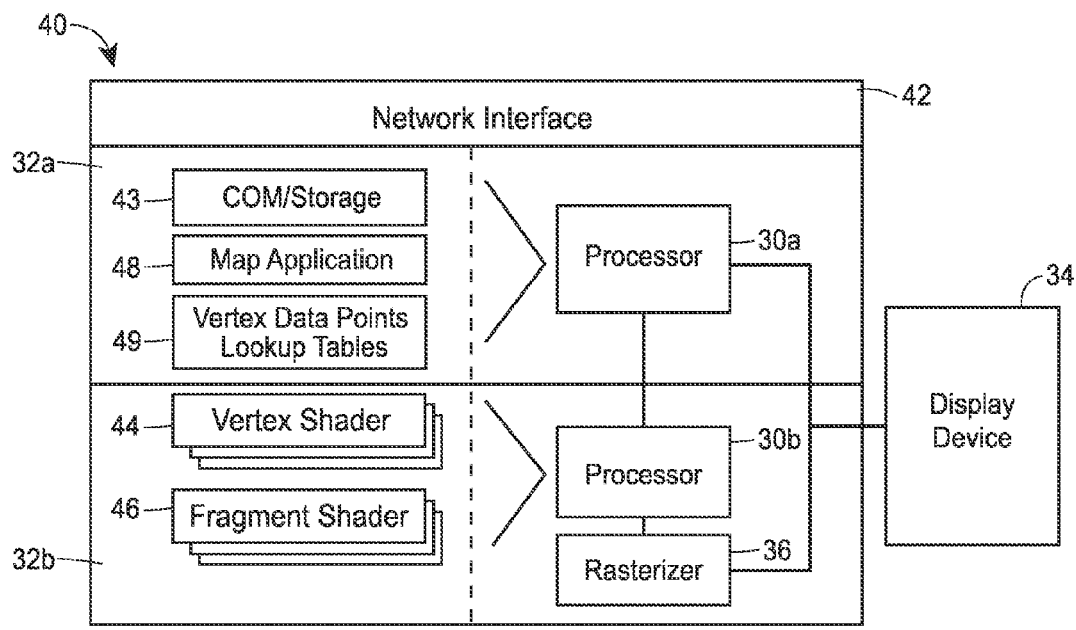
FIG. 2 is a high level block diagram of an image rendering engine used to render map images using map vector data.

Referring now to FIG. 2, an image generation or image rendering device 40 associated with or implemented by one of the client devices 16-22 is illustrated in more detail. The image rendering system 40 of FIG. 2 includes two processors 30a and 30b, two memories 32a and 32b, a user interface 34 and a rasterizer 36. In this case, the processor 30b, the memory 32b and the rasterizer 36 are disposed on a separate graphics card (denoted below the horizontal line), although this need not be the case in all embodiments. For example, in other embodiments, a single processor may be used instead. In addition, the image rendering system 40 includes a network interface 42, a communications and storage routine 43 and one or more map applications 48 having map display logic therein stored on the memory 32a, which may be executed on the processor 30a. Likewise one or more image shaders in the form of, for example, vertex shaders 44 and fragment shaders 46 are stored on the memory 32b and are executed on the processor 30b. The memories 32a and 32b may include either or both volatile and non-volatile memory and the routines and shaders are executed on the processors 30a and 30b to provide the functionality described below. The network interface 42 includes any well known software and/or hardware components that operate to communicate with, for example, the server 14 of FIG. 1 via a hardwired or wireless communications network to obtain image data in the form of vector data for use in creating an image display on the user interface or display device 34. The image rendering device 40 also includes a data memory 49, which may be a buffer or volatile memory portion of the memory 32 for example, that stores vector data received from the map database 12, the vector data including any number of vertex data points and one or more image textures as will be described in more detail.

During operation, the map logic of the map application 48 executes on the processor 30 to determine the particular image data needed for display to a user via the display device 34 using, for example, user input, GPS signals, prestored logic or programming, etc. The display or map logic of the application 48 interacts with the map database 12, using the communications routine 43, by communicating with the server 14 through the network interface 42 to obtain map data, preferably in the form of vector data or compressed vector data from the map database 12. This vector data is returned via the network interface 42 and may be decompressed and stored in the data memory 49 by the routine 43. In particular, the data downloaded from the map database 12 may be a compact, structured, or otherwise optimized version of the ultimate vector data to be used, and the map application 48 may operate to transform the downloaded vector data into specific vertex data points using the processor 30a. In one embodiment, the image data sent from the server 14 includes vector data generally including or defining data for each of a set of vertices associated with a number of different image elements or image objects to be displayed on the screen 34 and possibly one or more image textures that define or contain text strings or other labels to be displayed on the image with respect to the image objects. More particularly, the vector data for each image element or image object may include multiple vertices associated with one or more triangles making up the particular element or object of an image. Each such triangle includes three vertices (defined by vertex data points) and each vertex data point has vertex data associated therewith. In one embodiment, each vertex data point includes vertex location data defining a two-dimensional or a three-dimensional position or location of the vertex in a reference or virtual space, as well as one or more vertex attribute values and/or an attribute reference pointing to or defining a set of vertex attribute values. Each vertex data point may additionally include other information, such as an object type identifier that identifies the type of image object with which the vertex data point is associated. Likewise, the image textures, which are essentially text image or pixel lookup tables, define text characters, text strings or labels to be rendered on the image. While such image textures may be downloaded to the client devices 16-22, these image textures may also be generated at the client devices 16-22 use text character strings provided to or used at the client device 16-22.

Generally speaking, the imaging system for rendering text along a line within a map image described herein includes or involves three parts. First, text to be rendered in an image is placed into an image texture (without a path or particular orientation associated therewith) and is encoded with encoding data that defines certain characteristics of each text character within the text string. This step may be performed by a map application within a client device and, if so, the text string encoded texture is stored in a memory of the client device. If this encoding is performed at the server 14, this texture (also called an image or text string lookup table) may be stored in the map database 12 and may be sent to a client device 16-22 for storage and use in the client device. Second, a set of line segments for which the text to be rendered is to follow on an image are drawn or established, preferably as triangles with appropriate vertex attributes. Third, one or more shaders compute where to draw the text or the characters of the text strings stored in the texture so as to correctly follow the line segments, with individual character rotation being performed so that each of the text characters of the text string is rendered with an orientation that follows or is rotated correctly with respect to the line formed by the line segments.

As noted above, the rendering technique renders unrotated text into a texture or pixel map. Of course, this process can be performed using any desired text rendering library that renders text into an image texture or other type of lookup table. If more than one text string is to be placed into a texture, the location of each text string is recorded and is stored or provided as part of the texture. Moreover, the height of the text within each text string may be recorded and encoded into the texture or may be provided as attribute data for the texture.

In addition to rendering the unrotated text of the text strings within the texture, encoding data, such as a coded pixel stripe, is provided within the texture for each text string to define, along the X direction of the texture, the relative position of each pixel column of a text character with respect to the center of that text character. The encoding data may also define breaks or transitions between text characters within a text string. While the encoding data may be provided with the texture in any desired manner, the encoding data may be placed within the texture within a row of pixels immediately or closely above the top of the pixel locations of the text string being encoded.

Figure 3:
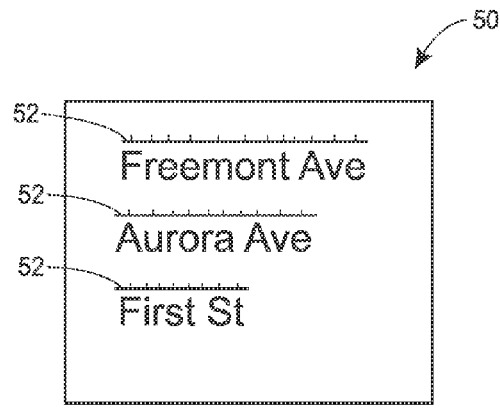
FIG. 3 is a depiction of an encoded texture having a text string and an encoding stripe that enables the text string to be rendered following a multi-segmented line within an image.

FIG. 3 illustrates an example texture 50 having three text strings located therein, in the form of street names of "Freemont Ave", "Aurora Ave" and "First St" As will be understood, the texture 50 stores pixel color values for each of the pixels making up the text characters that form the text strings. Moreover, encoding data in the form of an encoding stripe 52 is provided directly above, such as one pixel row above, the top of each of the text strings. Generally speaking, the pixel values within the row of pixels making up the encoding stripe 52 are encoded to reflect the center pixel column of each text character and the widths of text characters or distances to a center of an associated text character from any particular pixel column position. The encoding stripes 52 are illustrated in FIG. 3 as a line of pixels of constant color, but it will be understood that the encoding stripes 52 actually include different color or pixel values for different pixels positions thereof. Moreover, for the sake of illustration, the center pixel column associated with each of the text characters of the text strings are indicated within the encoding lines 52 of FIG. 3 by being marked with a small vertical line.

Figure 3A:
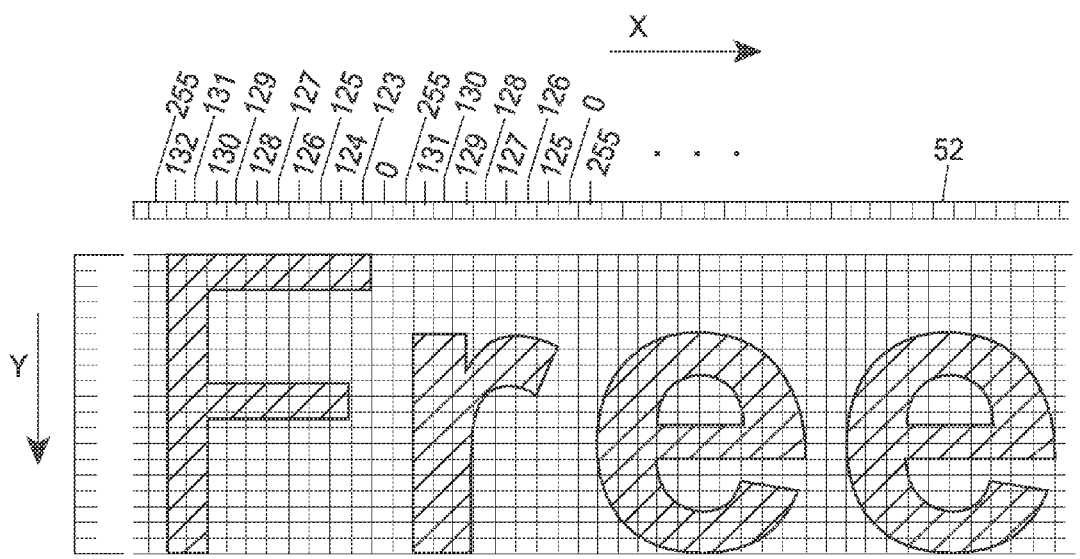
FIG. 3A is a depiction of a portion of the encoded texture of FIG. 3 illustrating the encoding stripe in more detail.

A portion of one of the encoding stripes 52 is illustrated in FIG. 3A in more detail. In particular, FIG. 3A illustrates a portion of the encoding stripe 52 disposed above the text characters "F r e e" of the "Freemont Ave" text string of FIG. 3. While the text characters F, r, e and e are shown in block relief over various pixel value locations in FIG. 3As, this is performed merely to illustrate the pixel rows and columns of the texture 50 associated with these text characters. It will be understood that the pixel values stored at these pixel locations will define the specific image features of these specific text characters. The encoding stripe 52 of FIG. 3A is located within the texture 50 directly above the text string with which the encoding stripe 52 is associated, e.g., in a row of pixels directly above the top row of pixels of the associated text string. In this case, the values of each of the pixels in the encoding stripe 52 reflect or specify the position along the X direction or the width of the texture 50 of that column of pixels, as measured with respect to the center of the particular text character located within the column of pixels directly below the encoding stripe 52. In one example, the pixel value at the center column of a text character may be set to be a value of 128 while the value of the pixels offset from the center pixel may be incremented (to the left for example) or decremented (to the right for example) by one for each pixel column away from the center pixel column of the text character. For example, the pixel range above the "F" text character in the "Freemont Ave" text string includes 12 pixels with the center pixel having a value of 128, the five pixels to the right of the center pixel having values of 127, 126, 125, 124, and 123, respectively, and the four pixels to the left of the center pixel having values of 129, 130, 131, and 132 respectively. The encoding stripe 52 may use the values of the red color of each pixel to perform this encoding, but could instead or in addition use other color values of the pixels for encoding text character centers and widths. In the example in which red pixel color values are encoded in the row of pixels within the texture 50 defining the encoding stripe 52, each pixel in the encoding stripe 52 has a red color value that, on a scale from 0 to 255, is 128 more than the pixel distance to the center of the text character currently below the pixel or within the same pixel column. One extra pixel can be included to the left and right of the pixels within the encoding stripe 52 for each text character, with the extra pixel on the left having a red value of, for example 255, and the pixel on the right having a red value of, for example, 0, to indicate the ends of the current text character. Of course, the encoding stripe 52 may be used to similarly encode each text character in the text string immediately below the encoding stripe 52. Still further, while the encoding stripe 52 is illustrated as being located above the associated text string, the encoding stripe 52 could alternatively be located below the text string within the same texture, or could be provided in other manners, such as in an additional or separate texture have a location that minors or that is correlated to the text string to which it is associated. In any event, the column position of the encoding stripe 52 is correlated in position to the pixel columns of the associated text character. However, the center position and width of each text character in a text string may be encoded or provided in any other desirable or useful manner.

As a result of storing and using the encoding data that may be provided in the form of the encoding stripe 52 for each text string in the texture, the image rendering system described herein is able to render the text characters in these text strings such that individual characters are drawn correctly oriented along a multi-segmented line. In particular, using the encoding data, the image rendering system is able to determine the relative distance to the center of an associated text character along the X coordinate of the texture at any particular location (i.e., pixel column) of each text character. Using this information, an image shader, such as one of the fragment shaders 46, may operate to correctly draw rotated text, i.e., text along a curved line, with no breaks in the middle of characters, as will be described below.

The second general step of the text rendering process described herein determines the line segments of the line that the text string within the encoded texture is to follow. This step may occur as the map image is being rendered and, of course, the manner in which the text string ultimately is rendered will be dependent on the specific line that the text to be rendered is to follow. Of course, the line to be followed may be any desired type of line, such as one that traverses down the center of a road created using vector based image objects, a line that follows a boundary, etc. Such lines may generally be determined and used to render text to label a road or other image feature. Of course, the line to be followed may be any other type of line, such as a line following an outline of an image feature, or any other desired line. The line to be used may be determined from other image features, such as the vertices of image objects, may be pre-stored in and provided from the map database 12, may be specified by a user, or may be determined in any other desired manner.

Upon identifying the line along which to render text, the line is broken into straight but connected line segments, wherein each line segment is generally at an angle to the immediately adjacent line segment(s). An example of a multi-segmented line 60 is illustrated in dotted relief in FIG. 4 as a line traversing down the center of a multi-sectional road 62. The segmented line 60 includes interconnected line segments 60A, 60B, 60C, and 60D. Of course, the line 60 and/or its associated line segments may be determined in any desired manner, such as based on data provided in the vertices defining the segments of the road 60.

Figure 4:
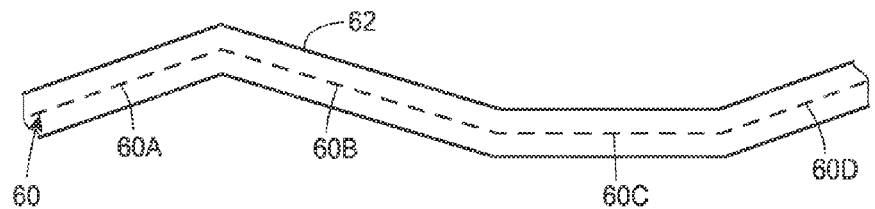
FIG. 4 is a depiction of a multi-segmented line following the center of a road in a map image.
Figure 5:
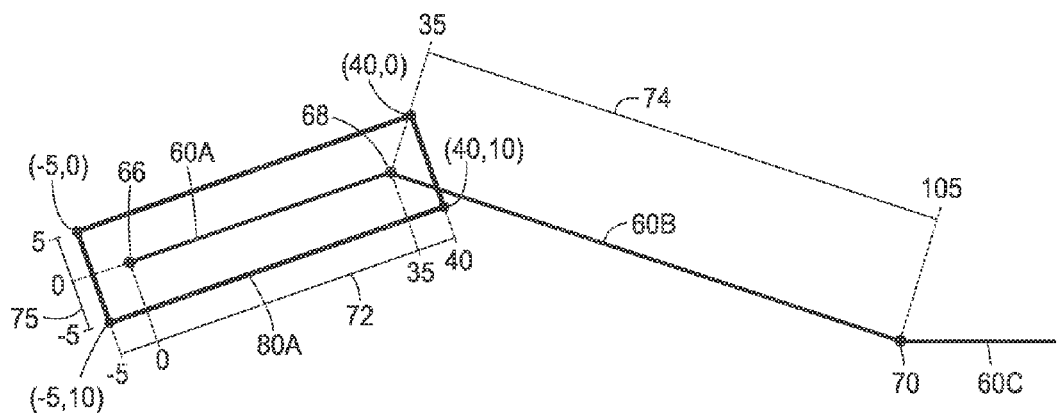
FIG. 5 is a graphical depiction of a first text box associated with a first line segment created to render text characters obtained from the texture of FIG. 3 following the multi-segmented line of FIG. 4.

FIG. 5 illustrates the line segments 60A and 60B of FIG. 4 in more detail. In FIG. 5, the line segment 60A is illustrated as beginning at a start point 66 and extending to an end point 68 while the line segment 60B is illustrated as extending from a start point 68 and extending to an end point 70. Moreover, the line segment 60A of FIG. 5 has a length of 35 (as measured in a space relative to the image on which the line is to be used, such as in pixel numbers or according to some other distance quantifier). In the case of FIG. 5, the line segment 60A is indicated as starting at a relative reference value of 0 (at the point 66) and extending to a relative reference value of 35 (at the point 68) along the scale 72 in FIG. 5 which is disposed parallel to the line segment 60A. In a similar manner, the line segment 60B has a length of 70 (in the relative image space) and starts at a relative reference value of 35 (at the point 68) and extends to a relative reference value of 105 (at the point 68) as illustrated by a scale 74, which is disposed parallel to the line segment 60B.

Once each of the line segments (e.g., 60A and 60B) of the line 60 is identified and the length thereof is determined, each line segment may then represented as a pair of triangles forming a rectangle, which will be referred to herein as a text box. Such a rectangle or text box 80A is illustrated in FIG. 5 for the line segment 60A. Generally speaking, the rectangle 80A will be used to define a set of vertices for a text box that is used by a fragment shader to render text along the line segment 60A. In particular, the vertices of the rectangle 80A are selected to span from a position in the image that starts a predefined or specific distance (such as half the width of the widest character of the text string to be rendered along the line 60) before the start of the line segment 60A (as measured in the direction along the length of the line segment 60A) to the predefined or specific distance (e.g., half the width of the widest character within the text string) after the end of the line segment 60A. In the example of FIG. 5, the predetermined distance is illustrated as being 5 (in the relative space of the image) and thus the rectangle 80A extends from −5 to 40 along the scale marker 72. In the direction orthogonal to the line segment 60A, the rectangle 80A spans another distance, such as half the height of the tallest text character to be rendered, in a direction orthogonal to the line segment 60A to the another distance (e.g., half the height of the tallest text character to be rendered) in the other direction orthogonal to the line segment 60A. Thus, as illustrated by the scale 75 of FIG. 5, the rectangle 80A spans from −5 to 5 (assuming that the height of the text string to be rendered along the line is 10 in the relative image space).

Now, the length of the entire line segment 60A from the start point 66 to the end point 68, which will be referred to herein as the range of the line segment 60A, is computed or is determined, and this range is set as two components of a vertex attribute for each of the vertices of the text box 80A (with the values of these vertex attributes being the same for each of the vertices of the triangles forming the text box 80A). The range of a line segment will thereby be used as or will be referred to as a range of the text box 80A in which the line segment is disposed. Thus, the range of the rectangle 80A will be the range of the line segment 60A along which text is to be rendered. This range will be used in a fragment shader to interpolate to compute length values for the vertices of the rectangle 80A such that linearly interpolating the length from one end of the rectangle 80A to the other end results in the correct length at the start of the line segment 60A, at the end of the line segment 60A, and at all points in between. Of course, this interpolation can be performed by subtracting half of the width of the widest character (i.e., the predetermined distance) from the length of the line segment 60A up to the start of the line segment 60A and using that for the rectangle vertices before the line segment 60A, and adding half of the width of the widest character (e.g., the predetermined distance) to the length of the end of the line segment 60A and using that for the rectangle vertices after the line segment 60A. In addition, the vertices of a text box above a line segment may be assigned a vertex attribute specifying a Y texture value of 0, and the vertices of the text box below the line segment may be assigned a vertex attribute specifying a Y texture value that is equal to the height of the text as rendered within the image. The X, Y coordinates of the outer vertices of the rectangle 80A of FIG. 5 are thus illustrated as being (−5,0), (40,0), (−5, 10), and (40, 10) in an image space that is centered on the start point 66 of the line segment 60A and extends parallel (in the X direction) and orthogonal to (in the Y direction) the line segment 60A. The use of this coordinate space is provided for ease of illustration only, and might not be the actual coordinate space used in the image itself or in the shaders performing interpolation and image rendering. However, conversion to a consistent image space may be accomplished by a coordinate rotation and translation to match the X, Y coordinate space of the image.

If multiple text strings are provided in the same texture that is being used to specify the text string to render in a text box (such as the text box 80A), it may also be necessary to send the Y offset the text string in question as stored within the texture (i.e., the Y offset of the text string to be rendered in the text box) as a vertex attribute so as to be able to render the correct text image within the text box. It may also be necessary for a shader that is to render the text string stored within a texture along a particular line segment (such as the line segment 60A) to know the size (e.g., height) of the text string within the texture to properly compute texture coordinates, so as to be able to locate the text character to be rendered at any particular time and to perform proper interpolation when rendering the text string on the image. However, the sizes (e.g., heights) of characters or text strings in the texture may be uniform, and this value can then be set as a uniform variable rather than as a vertex attribute of a text box.

Figure 6:
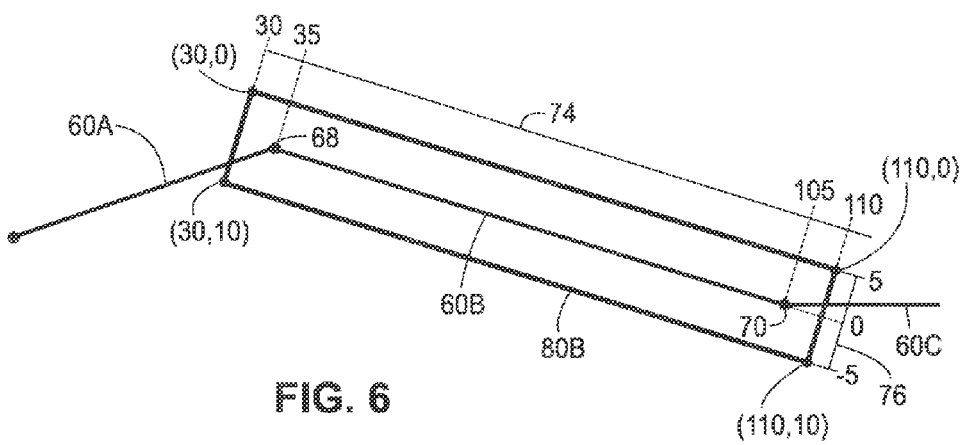
FIG. 6 is a graphical depiction of a second text box associated with a second line segment created to render text characters obtained from the texture of FIG. 3 following the multi-segmented line of FIG. 4.

As will be understood, a rectangle or a text box can be formed for each of the other line segments 60B, 60C, 60D, of the line 60 to be followed. As an example, a text box 80B is illustrated in FIG. 6 for the line segment 60B. The text box 80B has vertices at (30,0), (110, 0), (30, 10) and (110, 10) in the relative image space (now defined by the scales 74 and 76). Moreover, the range of this text box will be 35 to 105 as this is the range of the line segment 60B from its start point 68 to its end point 70 measured from the start of the line 60.

After the vertices for the two triangles for each of the rectangles or text boxes are defined for each of the line segments of the line along which the text to be rendered is to follow, these vertices and their associated attributes (e.g., two dimensional locations and ranges and text string coordinates) may be sent to one of the vertex shaders 44 to render the text boxes for each of the line segments of the line to be followed. These text boxes, once defined by the vertex shader 44 can then be used by a fragment shader 46 to render text within these text boxes, using one of the encoded text strings, as stored in the texture of FIG. 5 for example, in a manner described below.

Generally speaking, during operation, the fragment shader 46 determines which pixel from the text image to draw, if any, for each pixel in the text box defined for each of the determined line segments. More particularly, when rendering text along a multi-segmented line, the map application 48 uses the fragment shader 46 to place text from the text image in the various text boxes one text box at a time. In doing so, the map application 48 selects one of the line segments along which to begin rendering a particular text string and uses the text box created for that line segment. The first selected line segment or text box may be the line segment or text box having the range value of 0 therein. When operating using this text box, the fragment shader 46 may access the pixels of the first text character to be rendered from the appropriate texture and may look up or determine the relative distance to the center of that text character using the encoded stripe 52 within the texture. This function can be performed by using the interpolated length value as the X coordinate into the texture, divided by the width of the texture to get a texture coordinate for the position of the character being rendered, as stored within the texture. The Y coordinate into the texture can be computed to be the first row of pixels in the texture, or the first row after the texture offset if multiple strings are packed into the texture. Upon finding the current text character of the text string being rendered, the fragment shader 46 reads the appropriate color values from the encoding stripe 52 of the text string, and subtracts 128 to determine the distance to the center of the character. Adding the interpolated length gives the length up to the center of the character. If the center of the character (as interpolated into the image space) falls within the range of the text box, then the fragment shader 46 draws the pixel or pixels of the text image on the display within the text box. However, if the computed center of the text character is not between the first and second limits of the range provided for the text box, then the pixels of the current text character should be discarded and nothing is drawn. More particularly, the fragment shader 46 performs the determination of whether to place each pixel of a text character in the text box on a pixel by pixel basis, and thus performs the determination of whether a pixel of a text image is associated with a text character having a center point that falls within the range of the text box currently being rendered for each individual pixel analyzed. Of course, if desired, the fragment shader 46 could perform this analysis for each pixel column of the text image (when trying to fill in the corresponding pixels of the text box) and in this case will either draw the text image pixels of a column in the text box or not, depending on whether the center of the character falls within range of the text box. In any event, when any particular pixel or pixel column is not discarded, the fragment shader 46 can look up the colors for the text at that column of pixels using the same texture X coordinate as before, and one or more than the interpolated Y texture coordinate passed in as a vertex attribute (depending on the particular row of the column being rendered), divided by the texture height. This should give the corresponding pixel from the rendered text, correcting for the center encoding pixel above the text.

Of course, if the pixels of a text character are not drawn in the text box because the center of the text character is outside of the range of the text box, then the map application 48 will use the fragment shader 46 to draw that text character when processing or rendering the next or a subsequent text box (associated with the next or a subsequent line segment along the line). The fragment shader 46 repeats the process of determining if the pixels of a text character should be rendered in the currently selected text box or not until the shader 46 fills in the text box, i.e. reaches the end of the text box. Once the pixels of a text character are rendered within or using a particular text box, the fragment shader 46 tries to render the pixels of the next text character within the same text box and repeats this process until it reaches the end of the text box. As will be understood, the size of the text boxes formed for line segments may be small, and in fact may be smaller than the size of a character because, if a character is not rendered in one text box (as its center point extends outside the range of the text box) the character will be rendered in a subsequent text box (i.e., the text box in which the center of the text character falls). During this process, text boxes may be created in which no text characters are rendered.

The result of this process is that each of the text characters within the text image is rendered right side up (i.e., upright in the orientation of a text box) and following a line, but where each text character is rotated in orientation along the line to correctly follow the multi-segmented line. As a result, the text strings can be pre-computed in an unrotated manner and stored in a texture, and can be used again and again for multiple lines with different curvatures.

Figure 7A:
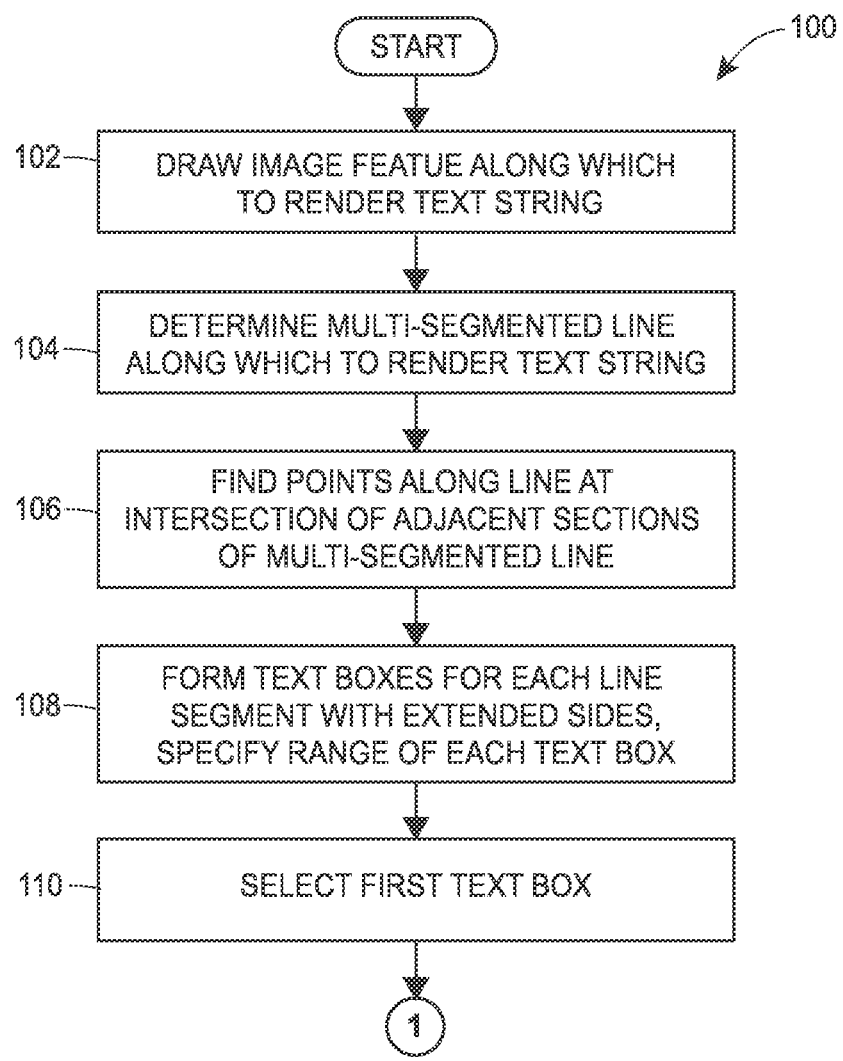
FIGS. 7A and 7B illustrate an example method, routine or process flow diagram that renders a set of text characters following a multi-segmented line within an map image using the text boxes of FIGS. 5 and 6 and the encoded texture of FIG. 3.
Figure 7B:
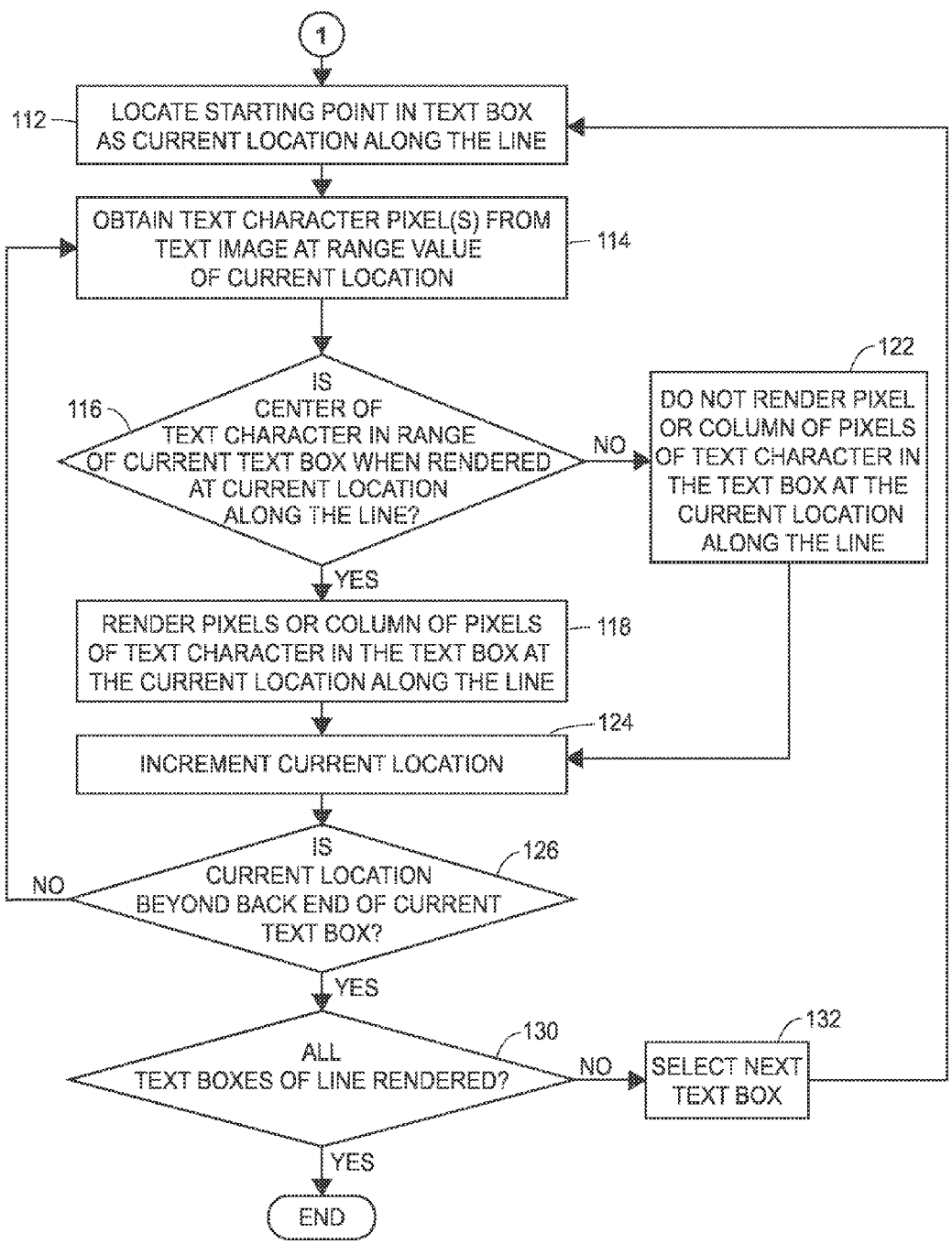

Referring now to FIGS. 7A and 7B, a process flow diagram or flow chart of a method, routine or process 100 that may used to render text along a line within an image using an encoded texture or text string lookup table, such as that of FIGS. 3 and 3A, is illustrated in more detail. As an example only, the routine 100 may be used in a map rendering engine, such as that of FIG. 2, to render text along or within the boundaries of a multi-segmented road and more particularly along a line that follows the center of that road, such that the text rendered is centered in the road spanning various segments of the road. Generally speaking, the routine or process 100 may be implemented as one or more software routines or applications, including routines that are part of the map application 48 and/or routines defined by the vertex and fragment shaders 44 and 46, which are executed in the processors 30a and 30b. These routines may be implemented or written in any desired language, such as Javascript, C code, etc. and may be executed on one or both of the processors 30a and 30b. Additionally, these routines may use the rasterizer 36 to render an image on the display device 34.

In any event, a block 102 of the routine 100 may draw or form an image feature, such as a multi-sectional road, along which text characters are to be applied. As part of or after this process is completed, a block 104 determines a multi-segmented line that follows the image feature, such as a multi-sectional road, along which the text string is to be rendered. In one example, this multi-segmented line may follow the centerline of the multi-sectional road, such as the line 60 illustrated in FIG. 4. Next, a block 106 finds or locates the points along the multi-segmented line at the intersection of each pair of adjacent sections of the multi-segmented line. Thus, the block 106 finds the start and end point of each line segment of the line along which text is to be rendered, and may assign a unique range to each segment of the multi-segmented line. The assigned range should extend consecutively or seamlessly across the boundaries of the line segments. That is, the range of the line may start at the beginning of one line segment and extend consecutively through that line segment and then through each of the following line segments so that no two line segments have the same range and only share common end points.

Next, a block 108 forms a text box for each line segment in the manner discussed above with respect to FIGS. 5 and 6. The vertices of these text boxes may be defined or computed, for example, in a routine within the map application 48 and may then be sent to one of the vertex shaders 44 of FIG. 2 to form text boxes in the image being rendered using the rasterizer 36. Of course, the outlines of the text boxes will be transparent or have no color, as the text boxes themselves will not be visual aspects of the image being rendered (although they could be if so desired). The vertices for each text box will specify the location of the text box vertices within the image, and will include, as attributes, the range of the line segment associated with the text box and, if needed, one or more references to the text string of the texture that is to be rendered in the text box. That is, if desired, the text box vertices may include, as attributes, pointers to the location within the texture at which the text string to be rendered along the line is located.

Next, at a block 110, the routine or process 100 selects a first one of the text boxes along which to begin rendering the referenced text string. This text box will generally be the text box having the zero (0) range value as this range value indicates the starting position along which to begin rendering the text string stored within the texture. However, this need not be the case, and the text could be rendered along the line beginning at any desired location or position along the determined line. In any event, a block 112 (FIG. 7B) locates the starting point in the current or selected text box at which text is to be rendered as the current location along the line. This starting point can be and generally will be (except for the first text box) at the beginning or front end of the text box. A block 114 then obtains the pixel or set of pixels associated with a column of a text character within the text string as stored within the texture that correspond to the range value associated with the current location along the line.

A block 116 then determines if the center of the text character with which those pixels are associated is in the range of the current text box (when the text size is interpolated to be fit within the size specified as part of the current text box) if the entire text character were to be placed or rendered in the current text box at the current location along the line. The block 116 may perform this test by reading the encoding stripe 52 of the texture immediately above the pixels of the text character being considered. That is, the block 116 may read the encoding stripe 52 to determine the pixel location (in the X direction of the texture) within the encoding stripe 52 for the current text character (i.e., without traversing across a 0 or a 255 valued pixel location) that has a red color value of 128, and then recognizing this position as the center (along the X direction of the texture) of the text character being considered. Alternatively or additionally, the block 116 may use the width encoding within the encoding stripe 52 to determine the distance to the center of the current text character. If, when interpolated properly to be placed within the current text box, the center pixel location of the current text character is within the range of the current text box, then a block 118 renders all of pixels of the current column of the text character in the current text box (at a properly interpolated size) at the current location along the line. On the other hand if, when interpolated properly to be placed within the current text box, the center pixel location of the text character is not within the range of the current text box, the block 118 is skipped (by block 122) so that the current pixel or current column of pixels of the text character are not rendered in the text box. These procedures may be performed in a fragment shader 46, if so desired. Of course, when the fragment shader 46 is rendering a text character within the text box, the pixels of the text character will be rendered along the X and Y orientations of the text box, so that the text character will be rendered in an upright position along the line, as defined by the orientation of the text box. Moreover, in operation, the routine 100 may perform the blocks 116 and 118 in succession on a pixel by pixel basis so that the fragment shader separately analyzes, for each pixel in a particular pixel column of the texture, whether the text character to which that pixel belongs has a center position falling within the range of the text box. For the sake of simplicity, however, the flow chart of FIGS. 7A and 7B does not indicate a pixel by pixel operation but instead indicates processing of text character pixels on a pixel column by pixel column basis.

In any event, after all of the pixels of a particular pixel column of the texture have been analyzed, a block 124 increments the current location along the line to the next position and a block 126 determines if the current location is beyond the back end of the current text box. If not, control is returned to the block 114 which obtains the next pixel (or set of pixels in a pixel column of the texture), and the steps of blocks 116-126 are repeated for the next column of pixels in a text character to see if those pixels should be rendered within the current text box.

However, at the block 126, if the new location of the line is found to be outside of or beyond the end of the current text box, then a block 130 (which may be run in the application 48 drawing the text along the line) determines if all text boxes for the line have been rendered. If not, a block 132 determines the next text box to render, and provides the specifics of that text box to the fragment shader 46 for rendering. Control is then provided to 112 which determines the starting point of the text image associated with the new text box as that point corresponding to the location along the line defined by the start of the new text box, and sets this point as the current location along the line. The fragment shader 46 then operates to implement the blocks 114 to 126 for the next text box. When the block 130 determines that the last text box has been rendered, the process of rendering the text string along the line will be complete for one text string in the texture.

As will be understood, the routine 100 essentially operates to find the text box along the selected or determined line in which the center of each text character will fall, and draws the entire text character in that text box. Because the range of the line is used to determine the position of the text characters with respect to one another, and this range is consecutive and unbroken at intersections of adjacent text boxes, the text characters will each be rendered in the correct direction (upright) with respect to the text box in which they are rendered. However, because the ends of each text box are extended beyond the range of the text box, the routine assures that an entire text character can and will be rendered in one and only one text box, i.e., the text box having the range value in which the center of the text character falls. This system enables text boxes to be of very small sizes, in which case a text character may not be rendered in each text box, such as may be the case with a continuously curving line. Thus, this technique enables text to be rendered correctly along any curved line.

It will of course be understood that the various actions specified by the different blocks of FIGS. 7A and 7B could be rearranged or reordered and performed in other manners or sequences. Moreover, the determination or establishment of text boxes could be performed on the fly, as each text box becomes needed when it is determined that text to be rendered falls outside of the current text box, instead of the text boxes being pre-established or predetermined before text rendering begins, as described herein.

While the encoding stripe 52 for a text string in a texture is described as being immediately or directly above an associated text string, this encoding stripe 52 could be provided in the texture below the text string or could even be provided in another texture or lookup table if so desired in a manner that is somehow correlated to or referenced the pixels of the associated text string. Moreover, the position of the center of each text character in a text string could be encoded in other manners than that described herein including in manners which do not use an encoding stripe 52. Moreover, in the cases in which an encoding stripe is used, the encoding technique is not limited to, for example, using the specific pixel values described herein. Thus, while the value of 128 is described herein as being used to indicate the center of a text character within the encoding stripe 52, other values could be used instead. Likewise, while the red color value of a pixel row is used for the encoding stripes 52 described herein, one or more other pixel color values could be used instead.

Moreover, as noted above, it is important that the fragment shader that is rendering the text string along a line be able to determine where the center of each text character is within a texture so that the fragment shader can determine whether the center of the text character falls within the range of a text box or outside of the range of the text box in which text characters are currently being rendered. One manner of determining the center of a character, as noted above, may be to encode the center of the characters in the texture or image lookup table itself, such as that illustrated in FIGS. 3 and 3A, in which a single encoding stripe is used for a single string or group of text characters.

Figures 8, 9:
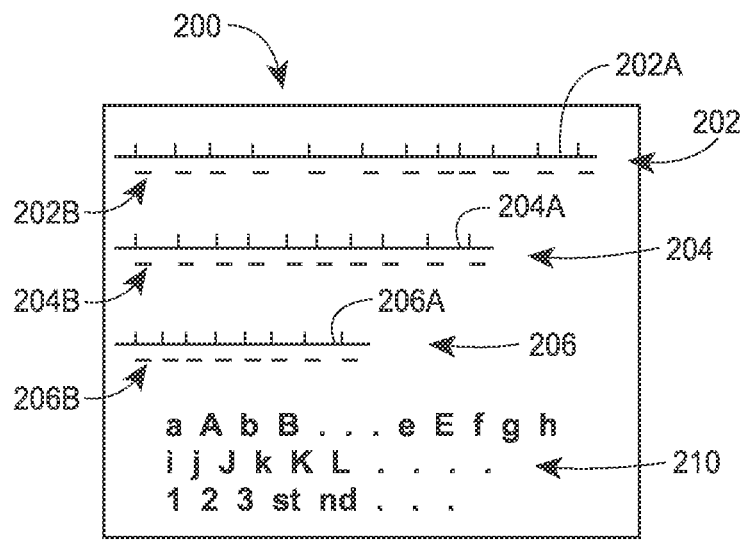
FIG. 8 illustrates a second texture having a second set of encoding lines disposed therein for each of a number of text strings, wherein each of the second encoding lines point to glyphs stored in the second texture.
FIG. 9 illustrates a text string having overlapping text characters.

Using other encoding techniques, however, it is possible to reduce the size of a texture or a text string lookup table by storing the different text characters to be rendered as parts of various different text strings (or as parts of the same text string) as a set of glyphs within a texture. In addition, such further encoding techniques need to provide first encoding data for each text string that includes center and/or width information for each text character of the text string and second encoding data pointing to a particular glyph that is to be used as a text character at each text character location of a text string. For example, FIG. 8 illustrates a texture 200 that stores encoding information 202, 204, and 206 for three different text strings, wherein these text strings may define labels or names for different roads in, for example, a map tile. The example lines of text encoding information 202, 204, 206 of FIG. 8 may define the text strings "Freemont Ave", "Aurora Ave" and "First St" for example. Each of the text strings associated with the encoding information 202, 204, and 206 may, for example, be provided to be rendered along different lines within a map image. In this case, each of the sets of encoding information 202, 204, 206 includes an encoding stripe 202A, 204A, 206A, respectively, which have pixel values denoting the center of each text character in the text string and/or the distances from each particular pixel column to the center of an associated text character. The encoding stripes 202A, 204A, and 206A are similar or are identical to the encoding stripes 52 of FIGS. 3 and 3A. Again, for the sake of illustration only, the center of each text character of a text string is indicated by a small vertical line in the encoding stripes. However, instead of storing an actual set of pixel values defining text characters in the texture directly below each of the encoding stripes 202A, 204A, and 206A, a second line of encoding is provided within each of the sets of text string encoding information 202, 204, and 206. These second lines of encoding, illustrated in FIG. 8 as encoding lines 202B, 204B, and 206B are essentially sets of pointers to positions within a field of glyphs 210 stored within the texture 200. Each of the glyphs within the field of glyphs 210 may be a single text character that is used in one or more of the text strings defined by the text string encoding information 202, 204, and 206. In this case, one or more of the glyphs within the field of glyphs 210 may be used more than once in the same or different text strings defined by the text string encoding information 202, 204, 206.

Thus, in the encoding technique illustrated in FIG. 8, each line or set of text string encoding information 202, 204, and 206 includes a first set of encoding data formed as a set of pixel values 202A, 204A, and 206A that indicate the width, spacing and center of each character (or glyph) within the associated text string as well as the relative spacing of different text characters or glyphs with respect to one another within the associated text string. Moreover, each line or set of text string encoding information 202, 204, and 206 includes a second line or set of pixels 202B, 204B, 206B that defines the position or location of the glyph as stored in the field of glyphs 210, that defines the particular text character to use at that position within the associated text string.

The second or further encoding lines 202B, 204B, 206B may be stored as a separate line of pixels within the texture 200 adjacent to, such as below, the first encoding lines 202A, 204A, 206A. In one embodiment, the second lines of encoding data 202B, 20BB, 206B, may include a separate set of glyph pointer values that start at, for example, the center of each text character as defined in the first line of encoding data 202A, 204A, 206A. As an example, each set of glyph pointer values may include four encoded pixel values which together point to the location of a particular glyph in the field of glyphs 210. As an example, only, the X position of a referenced glyph, as stored in the field of glyphs 210, may be stored in the first set of two pixel values (the first and second pixel values) while the Y position of the referenced glyph, as stored in the field of glyphs 210, may be stored in the second set of two pixel values (the third and fourth pixel values). As a more particular example, the X coordinate may be stored in the first and second pixel values by storing the X value of the referenced glyph divided by 256 in the first pixel location and storing the remainder (X modulo 256) in the second pixel location. In a similar manner, the Y coordinate of the referenced glyph may be stored in the third and fourth pixel values by storing the Y value of the referenced glyph divided by 256 in the third pixel location and storing the remainder (Y modulo 256) in the fourth pixel location. Of course, any other manner of providing or encoding pixel values with location pointers to other positions within the texture 200 (or even to locations within different texture in which glyphs are stored) may be used instead. Moreover, the location to which the glyph pointers reference could be the center of an associated glyph, a corner of the glyph location, such as the upper left-hand corner, the lower right-hand corner, or any other predefined position of a glyph. While glyphs, as stored in the texture 200, may be of a predetermined or predefined size, their size may vary as well. In this later case, the encoding lines 202A, 204A, 206A may be used to define the width of the glyph to be recovered and the height of the glyph may be fixed. Alternatively, the second encoding lines 202B, 204B, 206B of the text string information 202, 204, 206 may also include a size of the glyph to be obtained. In another embodiment, the glyphs themselves may have a set of pixel values defining their size and this set of pixel values may be recovered first to determine the exact pixel locations within the texture that are associated with any particular glyph.

Of course, the use of two or more encoding stripes, as illustrated in the example of FIG. 8, actually allows each text character or glyph used somewhere in one or more of the text strings to be stored in the texture 200 only once, because this glyph can be referenced numerous times by the same or different text encoding stripes. This dual encoding technique saves or reduces the space or data needed for a texture when downloading and storing the textures used to perform rendering of text within multiple sets of text boxes or along multiple different lines or when sending these textures between the processors 30a and 30b within the device 40. Moreover, while the second data encoding lines 202B, 204B, 206B are illustrated in FIG. 8 as being disposed in a pixel row immediately or slightly below the associated first encoding data line 202A, 204, 206A, respectively, the second data encoding lines 202B, 204B, 206B could be stored in the texture 200 at other locations, such as above the first encoding data lines or even as a set of pixel values for a different color field of the first encoding data lines. For example, if the first encoding data line is stored in a row of pixel locations using the red pixel values of that row of pixels, the second encoding data line could be stored in the blue or the green pixel values of this same row of pixels.

In some cases, as illustrated in FIG. 9, it may be desirable to create or render a text string that has overlapping characters. In the example of FIG. 9, the "r" and the "A" are overlapping because a portion of the "A" (i.e., the left-most column of pixel values) is located on the same X coordinate as the right-most column of the pixel values of the "r". The encoding techniques illustrated and described with respect to FIGS. 3, 3A and 8 are not capable of rendering such text using a single text encoding string because the positions of the text characters within the text string are all defined serially in a single line pixels, requiring a distinct transition between the end of one text character and the beginning of an adjacent character.

Figure 10:
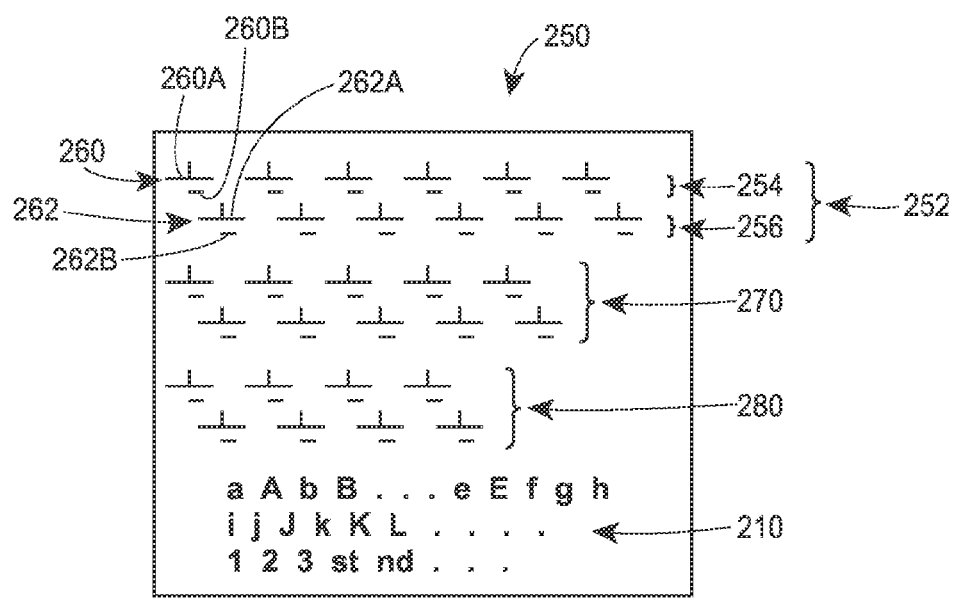
FIG. 10 illustrates a third texture using multiple encoding stripes for each of a set of text strings using the encoding technique of FIG. 8 to enable overlapping characters to be rendered following a line on an image.

To allow or enable the rendering of overlapping text characters or glyphs within a common text string, the encoding techniques described with respect to FIGS. 3, 3A and 8 may be modified to include multiple sets of lines of encoding for each text string. Such a technique is illustrated in the texture 250 of FIG. 10. In this case, a single text string 252 is illustrated as including two different sets of lines of encoding 254 and 256, with each line of encoding including the two encoding stripes described with respect to FIG. 8. In this case, a first character 260 of the text string information 252 (which may define the text string "Freemont Ave") is located in the upper set of encoding lines 254 and includes an encoding stripe 260A that defines the center of the text character (in the X direction) and the width or distance from the center of the first character and further includes a second line of encoding 260B that points to the location of the glyph within the field of glyphs 210 to use for the first text character. Now, however, the second character 262 of the text string information 252 is located in the lower line 256 and includes an encoding stripe 262A that defines the center of the second text character (in the X direction) and the width or distance from the center of the second character and includes a second line of encoding 262B that points to the location of the glyph within the field of glyphs 210 to use for the second text character. As illustrated in FIG. 10, because the encoding stripes 260A and 262A are on different rows of the texture 250, they can have pixel locations or pixel columns that overlap, when rendered on an image. Thus, as illustrated in FIG. 10, the right most pixel columns of the first character 260A overlap with the left-most pixel columns of the second character 262A. The fragment shader that reads the sets of encoding stripes 254 and 256 merely needs to read both encoding lines to recognize the next character to render for the text string 252. The fragment shader may, for example, alternate between the set of encoding lines 254 and 256 looking for the next character, may read both sets of encoding lines 254 and 256 and determine the next character based on the next detected center position (regardless of which encoding line the next center position is found), etc. Of course, the two sets of encoding lines 254 and 256 can be used in cases in which the text characters do not overlap, in which case either (1) one of the sets of encoding lines 254 or 256 will have no information and thus can be ignored, or (2) encoding stripes for adjacent text characters of the two encoding lines 254 and 256 will not overlap one another. Again, as illustrated in FIG. 10 by the sets of encoded data 270 and 280, multiple sets of text string encoding data, each having multiple sets of encoding data therein, may be stored in the texture 250 along with the field of glyphs 210.

Figure 11:
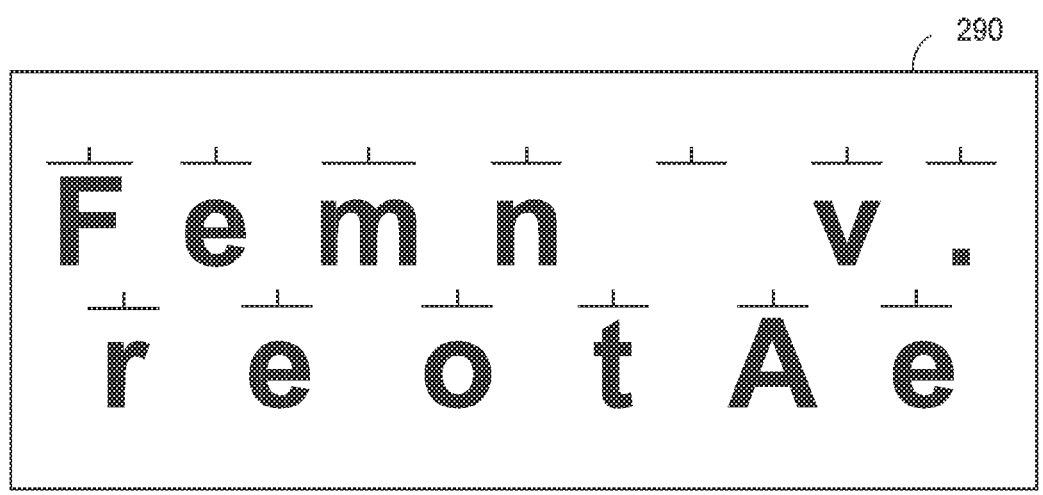
FIG. 11 illustrates a fourth texture using multiple encoding stripes for a text string using the encoding technique of FIG. 3 to enable overlapping characters to be rendered following a line on an image.

FIG. 11 illustrates a texture 290 that uses two encoding lines for a single text string in the case in which the text character pixels are located immediately adjacent the center and width encoding stripes 52. In particular, FIG. 11 illustrates a manner of applying the overlapping encoding data lines in the texture of FIG. 3 that does not use encoding data that references glyphs. In particular, in the example of FIG. 11, the two encoding lines are used provide overlapping of the "F" and the "r" of the text string "Freemont Ave." and of the "e" and the "." which are the last two characters of the text string.

Of course, the text rendering and texture encoding techniques described herein may be altered or varied in any number of manners to provide an image rendering system, such as a map rendering system, with the ability to render individual text characters within a text string along a curved, e.g., multi-segmented line.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the network 25 may include but is not limited to any combination of a LAN, a MAN, a WAN, a mobile, a wired or wireless network, a private network, or a virtual private network. Moreover, while only four client devices are illustrated in FIG. 1 to simplify and clarify the description, it is understood that any number of client computers or display devices are supported and can be in communication with the server 14.

Additionally, certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a map rendering system for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for a system and a process for rendering map or other types of images using the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for rendering a text image on a display device, comprising:

accessing, using a computer device, an image lookup table having a set of encoded data for two or more text characters associated with a text string of two or more text characters to be rendered in an image;

reading, using a computer device, the set of encoded data from the image lookup table to determine first and second encoding data for one of the text characters associated with the text string, the first encoding data for the one of the text characters defining information about the position of the text character in the text string and the second encoding data for the one of the text characters defining a reference to a field of pixels in the image lookup table storing a set of pixel values defining the image to be rendered for the one of the text characters;

determining, using the computer device, pixel values for the one of the text characters from the referenced field of pixels for the one of the text characters as stored within the image lookup table to analyze for rendering at a particular position within the image;

determining, using the computer device, a center position of the one of the text characters stored in the field of pixels defined by the second encoding data for the one of the text characters based on the first encoding data for the one of the text characters; and rendering, using the computer device, pixels of the one of the text characters at a particular position within the image based on the location of the center position of the one of the text characters.

2. The computer-implemented method of claim 1, wherein rendering the pixels of the one of the text characters at the particular position within the image based on the location of the center position of the one of the text characters includes determining if the center position of the one of the text characters, when rendered in a text box on the image, will be within a range of the text box and rendering the pixels of the one of the text characters at the particular position within the image when the center of the one of the text characters, when rendered in the text box on the image, will be within the range of the text box.

3. The computer implemented method of claim 1, further including not rendering the pixels of the one of the text characters at the particular position within the image when the center of the one of the text characters, when rendered in the text box on the image, will be outside of the range of the text box.

4. The computer-implemented method of claim 1, wherein reading the set of encoding data includes reading the first encoding data specifying a width of the text character.

5. The computer-implemented method of claim 1, wherein reading the set of encoding data includes reading the first encoding data stored for a particular column of pixels of the one of the text characters, the first encoding data specifying the distance from the particular column of pixels of the one of the text characters to a column of pixels at the center of the one of the text characters.

6. The computer-implemented method of claim 1, wherein reading the set of encoding data includes reading first encoding data stored in the image lookup table at a position adjacent to the second encoding data.

7. The computer-implemented method of claim 1, wherein reading the set of encoding data includes reading the first encoding data stored in a row of the image lookup table having first encoding data information defining, for each of a plurality of columns of the image lookup table, the distance from a column location to the column location of the center of the one of the text character.

8. The computer-implemented method of claim 7, wherein reading the set of encoding data includes reading the second encoding data from a row of the image lookup table associated with the row of the first encoding data, the second encoding data having a fixed location with respect to one of the columns of the first encoding data.

9. The computer-implemented method of claim 7, wherein reading the set of encoding data includes reading the second encoding data from a row of the image lookup table associated with the row of the first encoding data, the second encoding data starting at the column of the image lookup table at which the first encoding data indicates is the center column of the text character.

10. The computer-implemented method of claim 1, wherein the first encoding data for the one of the text characters is stored in a first row of encoding data spanning multiple columns of the image lookup table and wherein the second encoding data for the one of the text characters is stored in a second row of encoding data spanning a plurality of columns of the text image lookup table defining a subset of the multiple columns of the image lookup table used by the first encoding data, and wherein reading the first encoding data associated with the one of the text characters to determine a center position of the one of the text characters includes reading first encoding data for a particular column of pixels of the one of the text characters located in the field of pixels defined by the second encoding data of the one of the text characters.

11. The computer-implemented method of claim 1, wherein the image lookup table is two-dimensional texture map.

12. An image rendering engine, comprising;
a processor;
a memory coupled to the processor;
a display device coupled to the processor;
a text string lookup table stored in the memory that includes a set of glyphs and one or more sections of encoding data, wherein each glyph is stored as a field of pixels defining a displayable image associated with a text character, and wherein each section of encoding data defines a text string of two or more text characters to be rendered in an image, wherein each section of encoding data includes two or more sets of character encoding data with each set of character encoding data including first encoding data defining information about a position of a particular text character in the text string from which the center position of the particular text character can be determined and second encoding data defining a reference to one of the glyphs to define the identity of the particular text character in the text string; and
a routine, stored in the memory, that executes on the processor to read the first and second encoding data of a particular set of character encoding data for a text character to determine a position of one or more pixels stored with a glyph associated with the text character within the text string to be rendered in an image.

13. The image rendering engine of claim 12, wherein the routine determines a center of the text character of the glyph referenced by the second encoding data using the first encoding data associated with the particular set of character encoding data.

14. The image rendering engine of claim 12, including a further routine stored in the memory that executes on the processor to render pixels located at one or more positions within the field of pixels of one of the glyphs at a particular position within an image on the display device based on the first encoding data defining the location of the center position of the text character referenced by the second encoding data.

15. The image rendering engine of claim 14, wherein the further routine renders the pixels located at the one or more positions within the field of pixels of the one of the glyphs at the particular position within the image based on the first encoding data by determining if the center position of the text character, when rendered in a text box on the image, will be within a range of the text box and by rendering the pixels located at the one or more positions within the field of pixels of the one of the glyphs at the particular position within the image when the center of the text character, when rendered in the text box on the image, will be within the range of the text box.

16. The image rendering engine of claim 12, wherein the first encoding data includes encoding data specifying a width of a text character defined by a glyph.

17. The image rendering engine of claim 12, wherein the first encoding data for a particular text character includes first encoding data at each of a set of pixel columns for the particular text character specifying a distance from the pixel column of the first encoding data to the center pixel column of the particular text character defined by a glyph referenced by the second encoding data for the particular text character.

18. The image rendering engine of claim 12, wherein the first encoding data of each text character in the text string is stored at a position in the text string lookup table adjacent to the second encoding data of each text character.

19. The image rendering engine of claim 12, wherein the second encoding data of one of the text characters of one of the sections of sets of encoding data refers to the same glyph as the second encoding data of a different one of the text characters of the one of the sections of sets of encoding data.

20. The image rendering engine of claim 12, wherein the second encoding data of one of the text characters of one of the sections of sets of encoding data refers to the same glyph as the second encoding data of one of the text characters of a second one of the sections of sets of encoding data.

21. The image rendering engine of claim 12, wherein each of the sets of sections of encoding data includes the first encoding data stored in a row of the text string lookup table defining, for each of a plurality of columns of the text string lookup table, the distance from a column location to the column location of the center of a pixel column of the text character referenced by the second encoding data.

22. The image rendering engine of claim 21, wherein each of the sections of sets of encoding data includes the second encoding data stored in a fixed location in the text string lookup table with respect to one of the columns of the first encoding data.

23. The image rendering engine of claim 22, wherein second encoding data is stored starting at a column location of the text string lookup table at a column that is indicated by the first encoding data to be the center position of a text character.

24. The image rendering engine of claim 12, wherein the first encoding data for one of the text characters is stored in a first row of encoding data spanning multiple columns of the text string lookup table and wherein the second encoding data for the one of the text characters is stored in a second row of encoding data spanning a plurality of columns of the text string lookup table defining a subset of the multiple columns of the text string lookup table used by the first encoding data, and wherein the first encoding data for the one of the text characters defines a center position of the one of the text characters located in the field of pixels of the glyph defined by the second encoding data of the one of the text characters.

25. The image rendering engine of claim 12, wherein the first encoding data for each text character is stored in a row of the text string lookup table above the second encoding data for each text character.

26. The image rendering engine of claim 12, wherein the sets of character encoding data for one of sections of encoding data are stored as a single line of sets of character encoding data with the first encoding data for each text character within the one of the sections of encoding data sharing at least one common row in the text string lookup table but not having any overlapping columns in the text string lookup table.

27. The image rendering engine of claim 12, wherein the sets of character encoding data for one of sections of encoding data are stored as a two or more lines of sets of character encoding data with the first encoding data for each text character in the same line of sets of character encoding data sharing at least one common row in the text string lookup table but not having any overlapping columns in the text string lookup table and with the first encoding data for each text character in different lines of sets of character encoding data not sharing any rows of the text string lookup table.

28. The image rendering image of claim 27, wherein first encoding data for at least one text character in a first one of the lines of sets of character encoding data includes a column that overlaps with a column of a first encoding data of a different text character in a second one of the lines of sets of character encoding data.

29. The image rendering image of claim 27, wherein the at least one text character and the different text character are adjacent text characters in the text string defined by the section of encoding data.

30. A method of creating a text string lookup table, comprising:
storing, in a computer memory at memory positions defining the text string lookup table, a set of glyphs, wherein each glyph is stored as a field of pixels defining a displayable image associated with a text character such that multiple pixels are stored in the memory for each glyph; and
storing, in the computer memory at memory positions defining the text string lookup table, one or more sections of encoding data, wherein each section of encoding data defines a text string of two or more text characters to be rendered in an image and wherein each section of encoding data includes two or more sets of character encoding data with each set of character encoding data defining a text character of the text string and including first encoding data defining information about a position of a text character in the text string from which the center position of the text character can be determined and second encoding data defining a reference to one of the glyphs to define the identity of the text character in the text string.

31. The method of claim 30, wherein storing the first encoding data for each text character includes storing first encoding data defining the center position of a text character of the text string, the first encoding data for each of the sets of character encoding data being coordinated in location within the memory defining the text string lookup table with the second encoding data of the same set of character encoding data.

32. The method of claim 30, wherein storing the first encoding data for each text character includes storing first encoding data specifying a distance to a center of a text character at each of a set of different pixel positions of each text character.

33. The method of claim 30, wherein storing the first encoding data for each text character includes storing encoding data at each of a set of pixel columns for the particular text character specifying a distance from the pixel column of the encoding data to the center pixel column of the particular text character defined by a glyph referenced by the second encoding data for the particular text character.

34. The method of claim 30, wherein storing the first encoding data for each text character includes storing the first encoding data of each text character in the text string at a position in the text string lookup table adjacent to the second encoding data of each text character.

35. The method of claim 30, wherein storing the second encoding data of one of the text characters of one of the sections of sets of encoding data refers to the same glyph as the second encoding data of a different one of the text characters of the one of the sections of sets of encoding data.

36. The method of claim 30, wherein storing the second encoding data of one of the text characters of one of the sections of sets of encoding data refers to the same glyph as the second encoding data of one of the text characters of a second one of the sections of sets of encoding data.

37. The method of claim 30, wherein storing each of the sets of sections of encoding data includes storing the first encoding data in a row of the text string lookup table defining, for each of a plurality of columns of the text string lookup table, the distance from the column location to the column location of the center of a pixel column of the text character referenced by the second encoding data.

38. The method of claim 37, wherein storing each of the sections of sets of encoding data includes storing the second encoding data in a fixed location in the text string lookup table with respect to one of the columns of the first encoding data.

39. The method of claim 30, wherein storing the first encoding data for one of the text characters includes storing the first encoding data in a first row of encoding data spanning multiple columns of the text string lookup table and wherein storing the second encoding data for the one of the text characters includes storing the second encoding data in a second row of encoding data spanning a plurality of columns of the text string lookup table defining a subset of the multiple columns of the text string lookup table used by the first encoding data.

40. The method of claim 30, further including storing the sets of character encoding data for one of sections of encoding data as a single line of sets of character encoding data with the first encoding data for each text character within the one of the sections of encoding data sharing at least one common row in the text string lookup table but not having any overlapping columns in the text string lookup table.

41. The method of claim 30, further including storing the sets of character encoding data for one of sections of encoding data as two or more lines of sets of character encoding data with the first encoding data for each text character in the same line of sets of character encoding data sharing at least one common row in the text string lookup table but not having any overlapping columns in the text string lookup table and with the first encoding data for each text character in different lines of sets of character encoding data not sharing any rows of the text string lookup table.

42. The method of claim 30, including storing first encoding data for at least one text character in a first one of the lines of sets of character encoding data in a column that overlaps with a column for a different text character in a second one of the lines of sets of character encoding data.

* * * * *